United States Patent [19]

Tresslar et al.

[11] Patent Number: 4,870,887
[45] Date of Patent: Oct. 3, 1989

[54] BRAIDED SLEEVE

[75] Inventors: Marie C. Tresslar, Plymouth Meeting; Joseph S. Kite, III, West Chester; Michael J. Piotrowski, Plymouth; Thomas B. Conaghan, Exton, all of Pa.

[73] Assignee: The Bentley-Harris Manufacturing Company, Lionville, Pa.

[21] Appl. No.: 314,391

[22] Filed: Feb. 27, 1989

Related U.S. Application Data

[63] Continuation-in-part of Ser. No. 170,216, Mar. 18, 1988, abandoned.

[51] Int. Cl.$^4$ ............................ D04C 1/02; D04C 1/06
[52] U.S. Cl. ................................................ 87/9; 87/1; 87/23; 428/225; 428/228; 428/245
[58] Field of Search ........................................ 87/1, 5–9, 87/23, 28–30, 33, 34; 428/224, 225, 228, 245

[56] References Cited

U.S. PATENT DOCUMENTS

| 2,335,088 | 11/1943 | Shoemaker | 174/124 R |
| 2,393,530 | 1/1946 | Harris | 87/9 |
| 4,576,081 | 3/1986 | Felthuis et al. | 87/6 |
| 4,684,762 | 8/1987 | Gladfelter | 174/36 |
| 4,754,685 | 7/1988 | Kite et al. | 87/9 |

FOREIGN PATENT DOCUMENTS 863837 3/1961 United Kingdom ............... 87/9

Primary Examiner—John Petrakes
Attorney, Agent, or Firm—John T. Synnestvedt; Charles H. Lindrooth

[57] ABSTRACT a braided sleeve is formed from a tow of flexible filaments such as glass fibers and a rigid filament such as a stainless steel wire. The rigid filament reduces the tendency of a braided sleeve to fray at its ends, and can cause the end portions of the sleeve to taper inwardly, which can enhance the thermal insulation properties of the sleeve. The sleeve may be coated with polymeric material.

16 Claims, 1 Drawing Sheet

U.S. Patent
Oct. 3, 1989
4,870,887
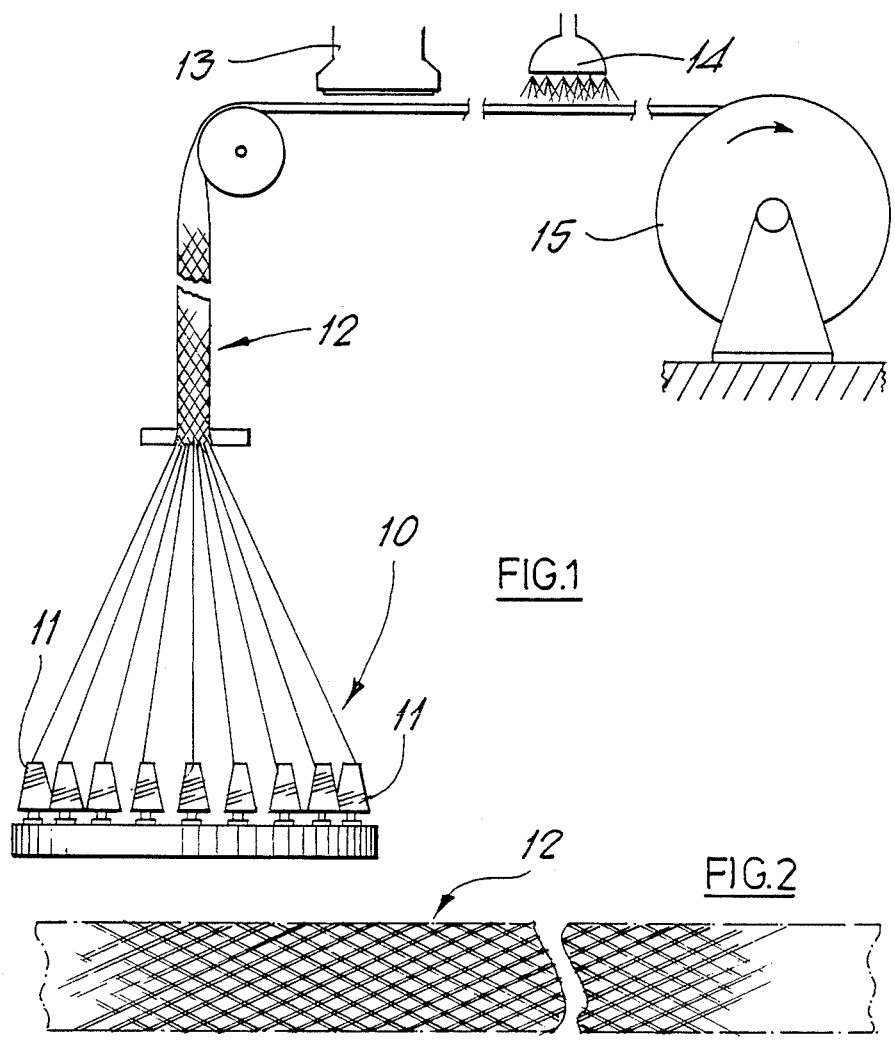
FIG.1
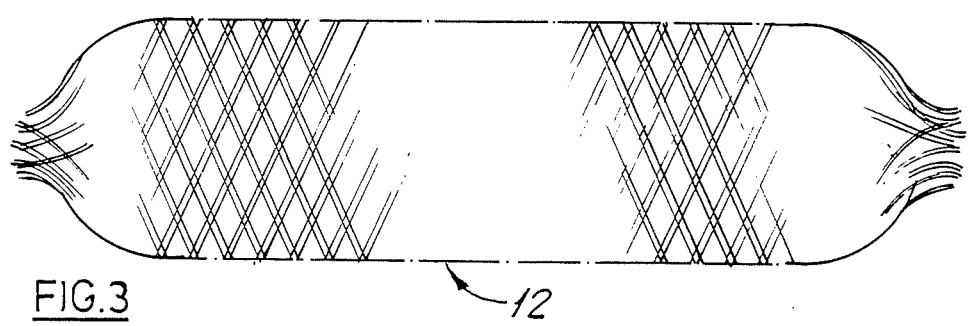
FIG.2
FIG.3

BRAIDED SLEEVE

RELATED APPLICATION

This application is a continuation-in-part of U.S. Application Ser. No. 07/170,216, filed Mar. 18, 1988, now abandoned.

BACKGROUND OF THE INVENTION

This invention relates to a braided sleeve.

Braided sleeves are commonly used for mechanical, electrical, flame or thermal protection of elongate objects such as pipes or tubes or, more especially, wire bundles. Such sleeves are generally formed from yarns, each of which comprises a tow of relatively flexible filaments. For example the yarn may comprise staple or continuous filaments. Staple filaments are generally relatively short compared with the length of the yarns formed from them, which yarns are generally formed by spinning the filaments. Continuous filaments are generally of such length that they extend substantially throughout the length of yarns formed from them.

The material from which such braided sleeves are formed is generally selected from the group consisting of ceramic, quartz, glass, carbon and engineering plastics (such as for example nylons, polyamides, polyesters, etc.), and mixtures thereof. The construction of tows from such filaments will generally be selected according to the requirements of the application to which the sleeve is to be put. The number and diameter of the filaments in each tow, and the number of tows in the braid and the number of carriers on the braiding machine are factors which can be varied in order to change the flexibility of, and degree of protection afforded by the sleeve.

The use of a braided sleeve has the advantage that its transverse dimension can be varied by the application of longitudinal force or outward radial pressure, this being a unique feature of a braided structure. This feature requires that the yarns from which the sleeve is made are able to move relative to one another in a trellis sense, that is by changing the braid angle. This movement tends to cause the yarns to splay radially of the end of the sleeve so that the sleeve frays, and the requirement that the yarns be able to move relative to one another generally means that it is not possible to hem or otherwise to seal the end of the sleeve to prevent such fraying.

SUMMARY OF THE INVENTION

We have found that fraying of a braided sleeve formed from tows of relatively flexible filaments can be reduced by incorporating in the sleeve yarns which comprise a relatively rigid filament.

Accordingly, the invention provides a braided sleeve which comprises:
 (a) first yarns each comprising a tow of relatively flexible filaments; and
 (b) second yarns comprising at least one relatively rigid filament;
the second yarns being distributed evenly around the circumference of the sleeve, and the number of second yarns being from about one third to about two thirds of the number of first and second yarns.

The second yarns will preferably comprise less than five, more preferably less than three filaments, especially one filament that is sufficiently rigid to prevent the filaments of the first yarn splaying radially outwardly. Suitable materials for the filaments of the second yarn will include engineering plastics and certain metals. A particularly preferred second yarns consists of a single filament of stainless steel.

The sleeve of the invention incorporates from about one third to about two thirds of yarns of a relatively rigid filament such as stainless steel wire. Preferably, the number of second yarns is from about 45% to about 55%, especially about 50%, of the number of first and second yarns. Preferably, the yarns are loaded symmetrically on the braider carriers and this can restrict the proportions of first and second yarns in the sleeve, depending on the number of carriers on the braider that is used to make the sleeve. The precise properties of first and second yarns will be selected depending on the construction of the tows and of the sleeve made from the tows and, in particular, on the tendency of the relatively flexible filaments to fray.

In addition to reducing the tendency of a braided sleeve to fray, when the sleeves are formed according to the present invention, the inclusion of relatively rigid filaments has the advantage that it tends to cause the end portions of the sleeve to taper inwardly. In use, this inward taper helps to locate the sleeve on an elongate object, for example by gripping the object. The central portion of the sleeve, between the tapered end portions, tends to stand proud of the object. This has the advantage of providing thermal insulation around the object in addition to that provided by the material of the sleeve itself by forming an air pocket around the object.

In carrying out this aspect of the invention, it is preferred that the second yarn be comprised of a relatively stiff material such as a single filament wire of stainless steel having a diameter of between about 0.003 and about 0.015 inches with a Young's modulus of between about 10,000,000 and about 40,000,000 pounds per square inch and an axial stiffness of about 100 to about 7500 pounds wherein axial stiffness is defined as the product of the Young's modulus and the cross-sectional area of the wire. In fabricating the sleeve, the wire or other relatively stiff filament comprising the second yarn is prestressed or set as by winding it on the braider bobbin in a relatively tight helix. In the braiding operation, the braided tube is formed with the braided structure tensioned or stretched to its minimum diameter. The helix of the second yarn in the braid when so formed should be a minimum of 1.3 times as long and is preferably greater than two times the length of the helix on the bobbin. The pitch angle of the helix of the second yarn in the braid should be a minimum of two times and is preferrably greater than four times the pitch angle of the helix on the bobbin. The differences in length and pitch angles selected are dependent upon the size and stiffness of the second yarn and are determinable by a few field trials. With the braid so formed, when tension is released, the relatively stiff preset yarn has a tendency to return to the bobbin helix. The braid will then foreshorten and as a braid naturally does when it is longitudinally compressed, it expands in diameter. In a section of braided sleeve so formed, a reduction of diameter can be seen at the cut ends, apparently because the non-wire yarn has no integrity, the forces in the wire causing a radial contraction of the end helices.

In another aspect, the invention provides a method of making a braided sleeve, which comprises braiding together;

(a) first yarns each comprising a tow of relatively flexible filaments; and
(b) second yarns comprising at least one relatively rigid filament, the number of braider carriers bearing the second yarn being from about one third to about two thirds of the total number of carriers used to form the sleeve, and the second yarns being distributed evenly around the circumference of the sleeve.

Preferably, the method includes the use of relatively stiff filaments capable of taking a set such as single filament wire having a Young's modulus of between about 10,000,000 and about 40,000,000 pounds per square inch and an axial stiffness of about 100 to about 7500 pounds as the second yarn and prestressing the second yarn in helical form as by winding the second yarn on a tight helix on the braider bobbins in relation to the helix of the wire in the braid. In the braiding operation, the braided tube is formed with the braided structure under tension at its minimum diameter. Preferably the helix of the wire and in the braid when so formed is a minimum of 1.3 times and most preferably greater than two times the length of the helix of the wire and the pitch of the helix to be at least twice that on the bobbin, the selected amount for a given wire and desired product being determined by a few field trials.

Preferably, the method includes the step of applying a polymer coating to the braided yarns. The polymer coating may be applied to one or both of the principal surfaces of the sleeve; it may be applied by dip coating or by spraying.

A polymer coating on one or both surfaces of the sleeve has the advantage that the sleeve has greater integrity. The polymer coating can also reduce yet further the tendency of the filaments of the first yarn to fray.

BRIEF DESCRIPTION OF THE DRAWINGS

How the foregoing and other objects and advantages of the invention are achieved will be seen more fully from the description of the accompanying drawings, in which:

FIG. 1 is a schematic view illustrating the manufacture of sleeves formed according to the present invention; and FIGS. 2 and 3 are views showing the braided sleeve respectively under tension in the braider and in relaxed form cut to length suitable for use.

DESCRIPTION OF A PREFERRED EMBODIMENT OF THE INVENTION

FIG. 1 shows in schematic form a braider 10 which includes a plurality of bobbins or carriers 11 there being wire and nonwire yarn carriers disposed on the braider in predetermined relationship. In a preferred arrangement, every other carrier is a wire carrier. As indicated above, sleeve 12 is braided under tension so that the sleeve is braided at its minimum diameter. Preferably the sleeve is subjected to a heat treatment by heater means schematically represented at 13. Polymer coating may be applied as a spray as indicated by sprayer 14 or by immersion in a bath, not shown. After drying the finished sleeve is wound on take-up reel.

FIG. 2 illustrates the sleeve during braiding with the sleeve under tension. FIG. 3 shows a section of the same sleeve cut to desired length. As shown in FIG. 3, the sleeve in relaxed state axially compresses, apparently due to the return of the relatively stiff yarn to the bobbin helix. As the braid foreshortens, the diameter increases about four times the diameter of the tensioned sleeve except at the ends where the forces in the wire cause a radial contraction of the end helices.

EXAMPLE

A sleeve was braided using a 96 carrier braider from a yarn which comprises two tows of textured fiberglass, ETG9.0 sold by Owens Corning, and a yarn of 0.006" diameter hard stainless steel wire having a Young's modulus of about 23,000,000 psi and axial stiffness which was determined to be about 650. The yarns were loaded symmetrically on the braider. The length of the helix of the wire on the bobbin was $2\frac{3}{4}$ inches and the length of the helix of the wire in the braid wire when under tension was about $6\frac{1}{4}$ inches. The ratio of wire to total yarn was 50%. A comparison of the sleeve as braided under tension and in its relaxed foreshortened state can be seen on reference to FIGS. 2 and 3.

The thermal insulation properties of the sleeve were compared with those of a sleeve which did not contain wire, and it was found that the sleeve of the invention had the better performance. It is believed that this results from the ability of the sleeve of the invention to trap a pocket of air around the object to be insulated, in turn because of the radial resilience of the sleeve conferred by the wire.

We claim:
1. A braided sleeve which comprises:
   (a) first yarns each comprising a tow of relatively flexible filaments; and
   (b) second yarns comprising at least one relatively rigid filament;

the second yarns being distributed evenly around the circumference of the sleeve, and the number of second yarns being from about one third to about two thirds the number of first and second yarns, said second yarn being prestressed to a relatively tight helical form, and said sleeve being braided under tension sufficient to elongate the helices of the yarns in the braid by at least 30% during braiding.

2. A braided sleeve as claimed in claim 1, in which the second yarn comprises a metallic wire.

3. A braided sleeve as claimed in claim 2, in which said metallic wire has a Young's modulus of $10 \times 10^6$ to $40 \times 10^6$ p.s.i. and an axial stiffness of about 100 to about 7500 pounds.

4. A braided sleeve as claimed in claim 3, in which the tension is sufficient to elongate the helix of the yarns in the braid by at least 100% during braiding.

5. A braided sleeve as claimed in claim 4, in which the wire is stainless steel.

6. A braided sleeve as claimed in claim 5, in which the wire has a diameter of between about 0.003 and 0.015 inches.

7. A braided sleeve as claimed in claim 1, in which the first yarn comprises a tow of glass fibers.

8. A braided sleeve as claimed in claim 1, which includes a polymer coating applied to the first and second yarns once they have been braided.

9. A braided sleeve as claimed in claim 8, in which the material of the polymeric coating is thermoplastic.

10. A method of making a braided sleeve, which comprises braiding together:
   (a) first yarns each comprising a tow of relatively flexible filaments; and
   (b) second yarns comprising at least one relatively rigid filament, said relatively rigid filament having a Young's modulus of $10\times 10^6$ to $40\times 10^6$ p.s.i. and an axial stiffness of about 100 to about 7500 pounds; the number of braider carriers bearing the second yarn being from about one third to about two thirds of the total number of carriers used to form the sleeve, and the second yarns being prestressed to a relatively tight helical form and being distributed evenly around the circumference of the sleeve, said sleeve being braided under tension sufficient to elongate the sleeve by at least 30% during the braiding operation.

11. A method as claimed in claim 10, in which the first yarns comprise a tow of glass fibers.

12. A method as claimed in claim 10, in which the relatively rigid filament is a metallic wire.

13. A method as claimed in claim 12, in which the metallic wire is a single filament wire having a diameter of about 0.003 to 0.015 inches.

14. A method as claimed in claim 10 which includes the step of applying heat to the braided yarns.

15. A method as claimed in claim 10 which includes the step of applying a polymer coating to the braided yarns.

16. A method as claimed in claim 15, in which the polymer coating is applied to the external surface of the braided yarns.

* * * * *